US011165237B2

(12) United States Patent
Jakupi et al.

(10) Patent No.: US 11,165,237 B2
(45) Date of Patent: *Nov. 2, 2021

(54) ARC FAULT DETECTION USING FREQUENCY HOPPING TECHNIQUES

(71) Applicant: SCHNEIDER ELECTRIC USA, INC., Andover, MA (US)

(72) Inventors: Andi Jakupi, Marion, IA (US); Michel Layour, Saint Laurent en Beaumont (FR); Hynek Raisigel, Saint-Egreve (FR); Costin Vasile, Calarasi (RO); Paul A. Reid, Cedar Rapids, IA (US); Gary Scott, Mount Vernon, IA (US); Joseph Beierschmitt, Marion, IA (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,816

(22) Filed: Feb. 12, 2020

(65) Prior Publication Data
US 2020/0235561 A1 Jul. 23, 2020

Related U.S. Application Data

(63) Continuation of application No. 15/985,823, filed on May 22, 2018, now Pat. No. 10,601,213.

(51) Int. Cl.
*H02H 1/00* (2006.01)
*H02H 3/33* (2006.01)

(52) U.S. Cl.
CPC ........ *H02H 1/0015* (2013.01); *H02H 1/0092* (2013.01); *H02H 3/33* (2013.01)

(58) Field of Classification Search
CPC ....... H02H 1/0015; H02H 1/0092; H02H 3/33
(Continued)

(56) References Cited

U.S. PATENT DOCUMENTS 7,062,388 B2 6/2006 Rivers, Jr. et al.
7,492,163 B2 2/2009 Restrepo et al.
(Continued)

FOREIGN PATENT DOCUMENTS

CA 2667883 5/2008

OTHER PUBLICATIONS

International Search Report and Written Opinion for International Application No. PCT/US 19/33442 dated Aug. 16, 2019.

*Primary Examiner* — Giovanni Astacio-Oquendo
(74) *Attorney, Agent, or Firm* — Locke Lord LLP

(57) ABSTRACT

An arc fault detection system samples a high frequency signal on a power line sequentially at different frequency regions according to a frequency hopping sequence, which is repeated a number of times over a predefined period. The different frequency regions include at least one region with a carrier for power line communication on the power line and at least one region without a carrier for power line communication on the power line. The system obtains energy measurements for each frequency region based on the sampled signals, computes an energy level for each frequency region based on the measurements for each region, and assigns a binary value to each region according to the corresponding energy level. The binary value represents a presence or absence of signal content in the frequency region. The system determines a presence or absence of an arc fault based on the binary values for the frequency regions.

20 Claims, 12 Drawing Sheets

(58) Field of Classification Search
USPC .............................................. 324/537, 76.52
See application file for complete search history.

(56) References Cited

U.S. PATENT DOCUMENTS

| | | | |
|---|---|---|---|
| 7,925,458 B2* | 4/2011 | Kolker | G01R 31/50 |
| | | | 702/59 |
| 9,124,127 B2 | 9/2015 | Timbus et al. | |
| 2006/0224336 A1 | 10/2006 | Petras et al. | |
| 2006/0259255 A1 | 11/2006 | Anderson | |
| 2007/0252603 A1 | 11/2007 | Restrepo et al. | |
| 2008/0091308 A1 | 4/2008 | Henson et al. | |
| 2008/0106832 A1 | 5/2008 | Restrepo et al. | |
| 2010/0219838 A1* | 9/2010 | Prabhu K | G01R 31/1272 |
| | | | 324/509 |
| 2011/0141644 A1 | 6/2011 | Hastings et al. | |
| 2011/0249370 A1 | 10/2011 | Nayak et al. | |
| 2014/0084942 A1* | 3/2014 | Logvinov | H04B 3/54 |
| | | | 324/551 |
| 2014/0327449 A1 | 11/2014 | Shuey et al. | |
| 2015/0346263 A1 | 12/2015 | Curtis | |
| 2019/0222017 A1* | 7/2019 | Miller, III | A61G 12/004 |
| 2019/0339961 A1* | 11/2019 | Jakupi | H04B 3/542 |
| 2019/0363530 A1* | 11/2019 | Jakupi | H02H 1/0092 |

\* cited by examiner

ARC FAULT DETECTION USING FREQUENCY HOPPING TECHNIQUES

PRIORITY

The present U.S. patent application is a continuation of U.S. patent application Ser. No. 15/985,823, filed May 22, 2018, and claims priority under 35 U.S.C. § 120. The disclosure of the above priority application is incorporated herein, in its entirety, by reference.

FIELD

The present disclosure is related to a method and system for improving arc fault detection, and more particularly, to a method and system for improving interoperability of arc fault detection and power line communications (PLC) in a branch circuit.

BACKGROUND

Power line communication (PLC) devices can be used in buildings, such as a residential home (e.g., house, condominium, apartment, etc.), to enable data communications across a power system infrastructure, such as power lines of a branch circuit(s). PLC devices conduct communications in the high frequency ranges, such as for example in the unregulated range from 2 MHz to 30 MHz and to as high as 86 MHz (see, e.g., HomePlug Avx and HomePlug Green-Phy). Power line communication protocol used by PLC devices can include, for example, IEEE 1901, IEEE P1901.2, HomePlug GP/AV/AV2/1.0, G.hn, or G.hnem. When PLC devices are employed in a building or other structure along with an arc fault circuit interrupter (AFCI) device, the presence of PLC signals, particularly the high frequency content of their carrier signals may be inadvertently interpreted by the AFCI device as arc fault signals, and thus, may result in nuisance trips by the AFCI device. Accordingly, PLC signals and other high frequency noises may interfere with arc fault detection at the high frequency ranges, e.g., frequency ranges greater than or equal to 1 MHz.

One method to detect the presence of power line carriers is based on the Receiver Signal Strength Indicator (RSSI) of high frequency content of power line carriers. However, the RSSI method does not appear to be robust due to the fact that RSSI does not contain frequency information, and therefore, any arc fault signal could look like a PLC signal or vice-a-versa from the signal strength point of view. This RSSI method thus can not be used to detect for an AF signal.

Another detection method involves selecting a frequency region (e.g., region, band, etc.) that corresponds to one of the notch bands of the power line carriers. The notch bands represent narrow frequency regions that are not enabled or used by the PLC device to conduct communication. However, such a detection method allows only a small window, e.g., a narrow frequency region, for the arcing signals to be detected. Furthermore, such a frequency region might be used by radio stations (e.g., amateur radio) or correspond to a network impedance (resonance/anti-resonance) point which could cause substantial sensitivity issues.

SUMMARY

To address these and other shortcomings, an arc fault detection method and system are provided, which monitor and analyze high frequency signals on a power line of a circuit to detect for an arc fault event. The arc fault detection method and system sequentially sample a high frequency signal from the power line at different frequency regions according to a frequency hopping sequence, which is performed multiple times to obtain a plurality of sampled signals for each frequency region in the sequence over a predefined period of time, e.g., a half-cycle of a base frequency. The frequency hopping sequence has one or more frequency regions that include a carrier of power line communication or known high frequency noise, and one or more frequency regions that exclude a carrier of power line communication or known high frequency noise. The arc fault detection method and system measure and evaluate the energy of the sampled signals for each frequency region to determine a presence or absence of signal content in each frequency region of the sequence. Given the wide-band nature of arc fault signals, an arc fault can thus be detected based on the presence or absence of signal content across the different frequency regions within the predefined time period.

Accordingly, arc fault detection can be performed in the high frequency range (e.g., 1 MHz and greater, 1 MHz up to 40 MHz, with the current design, etc.), which is subject to less load noise than lower frequency ranges (e.g., such as noise from vacuum cleaners, ballasts, switching mode power supplies which range from 20 kHz to 100 kHz, etc.). The arc fault detection method and system can sample and evaluate high frequency signals on the power line to detect for an arc fault signal, even when high frequency noise may be injected onto the power line from power line communication or other known high frequency noise injecting activities. Furthermore, signals are sampled for each frequency region at spaced-apart time intervals within the predefined time period to provide a more reliable assessment of the energy in each frequency region. By sampling signals using a combination of frequency regions which include or exclude known noise carriers, it is also possible to better discriminate such noise (e.g., PLC signals) from arc fault frequency signals to reduce nuisance detection and tripping.

In accordance with an embodiment, an arc fault detection method and system are provided to detect an arc fault on a power line. The arc fault detection method and system sample a high frequency signal on a power line sequentially at different frequency regions according to a frequency hopping sequence over a predefined time period. The sampling sequence is performed a number of times over a predefined time period. The different frequency regions include at least one frequency region that includes few carriers for power line communication on the power line and at least one frequency region that does not contain any carriers for power line communication on the power line. The arc fault detection method and system further obtain a plurality of energy measurements for each frequency region in the frequency hopping sequence based on the sampled high frequency signals; compute an energy level for each frequency region of the frequency-hopping sequence based on the plurality of energy measurements for each frequency region; and assign a binary value to each frequency region in the frequency hopping sequence according to the energy level corresponding to the frequency region. The binary value represents a presence or absence of signal content in the frequency region. The arc fault detection method and system can determine a presence or absence of an arc fault event based on the binary values for the frequency regions of the frequency hopping sequence. When an arc fault event is detected, power can be interrupted on the power line.

The predefined time period can be a half-cycle of a base frequency. The frequency of each frequency region can sequentially increase or decrease (or not) in the frequency hopping sequence.

To obtain an energy measurement, the arc fault detection method and system can, for each iteration of the frequency hopping sequence, generate an energy envelope or receiver signal strength indicator (RSSI) sample, e.g., an RSSI voltage sample, for each frequency region in the frequency hopping sequence based on the sampled high frequency signals. To compute an energy level, the arc fault detection method and system can, for each frequency region, autocorrelate the plurality of energy envelopes or RSSI voltage samples of the frequency region to obtain a peak energy value as the energy level, or sum squared RSSI samples (e.g., RSSI voltage samples) of the frequency region to obtain a summed energy value as the energy level.

The frequency hopping sequence can include a sequence of M frequency regions (or steps), and the frequency hopping sequence is performed N times during one half-cycle. The arc fault detection method and system can compute the energy level E for each of the M frequency regions during one half-cycle by determining the peak of autocorrelation of the N samples or in a similar way by summing the square of N samples for each frequency step (M):

$$E_m = \max(ACR_m) = \Sigma_{i=n}^{N} S_{mi}^2,$$

where: m is the order frequency region between 1 to a maximum M in the frequency hopping sequence, n is a number from 1 to a maximum N that the frequency hopping sequence is performed, and S is an energy measurement sample at a frequency step of a frequency hopping sequence.

To sample a high frequency signal, the arc fault detection method and system can, for each frequency region in the frequency hopping sequence, down convert the high frequency signal associated with the frequency region, apply a low pass filter to the down converted signal, and generate an energy envelope or RSSI sample for the filtered signal.

The arc fault detection method and system can determine a presence or absence of an arc fault event when the binary values satisfy a predefined condition.

The arc fault detection system can include an analog front end, a memory and a processor. The analog front end can include a mixer configured to sequentially demodulate the high frequency signal at different frequency regions according to the frequency hopping sequence using a local oscillator or phase locked loop. The high frequency signal is demodulated by the mixer to a baseband signal. The analog front end can further include one or more band pass filters to filter the high frequency signal or the demodulated baseband signal or both to narrow the band to a region of interest.

DESCRIPTION OF THE FIGURES

The description of the various example embodiments is explained in conjunction with the appended drawings.

DISCUSSION OF EXAMPLE EMBODIMENTS

Figure 1:
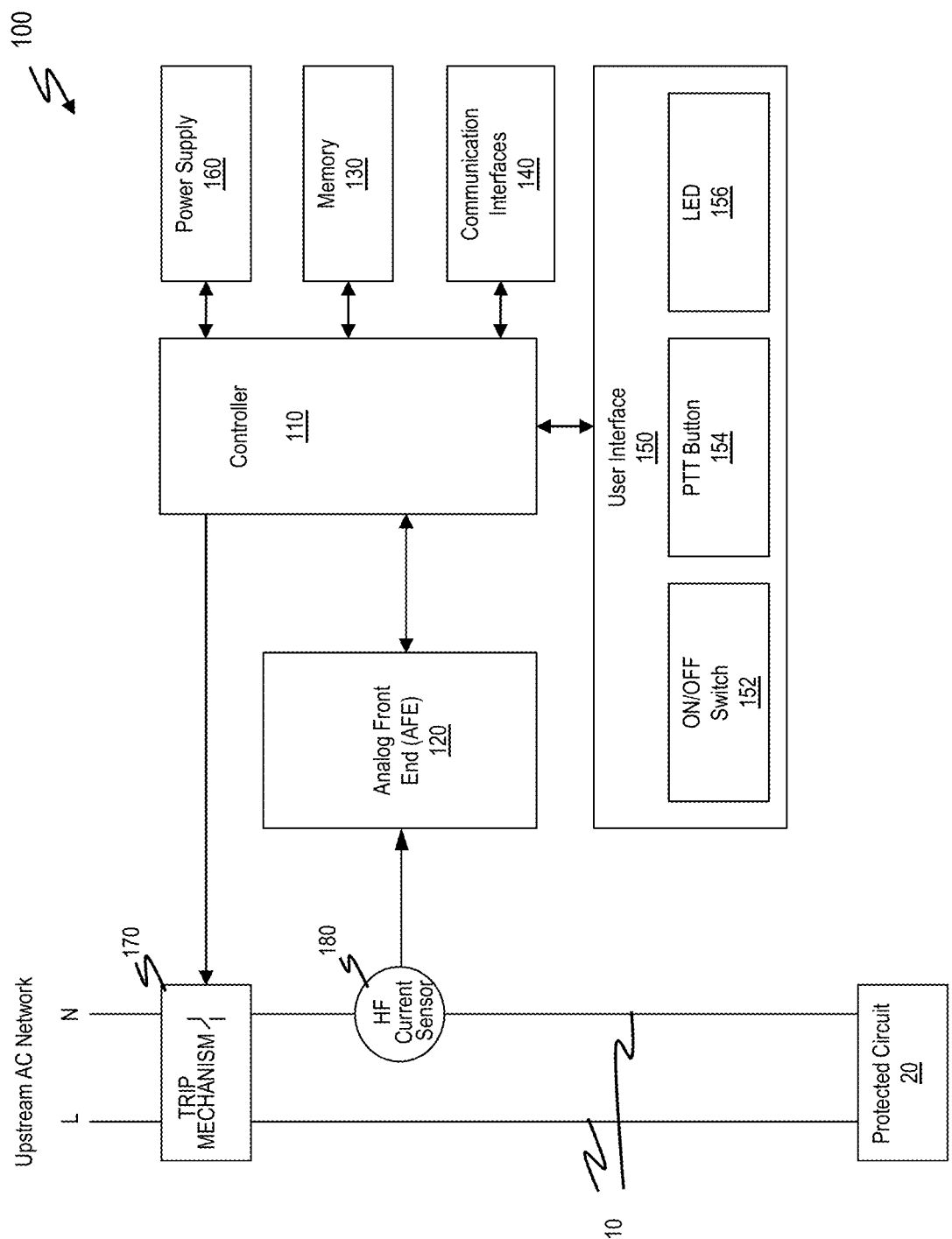
FIG. 1 illustrates a block diagram of a circuit breaker with an arc fault detection system which samples high frequency signals on a power line using frequency hopping sequence in accordance with an example embodiment of the present disclosure.

FIG. 1 illustrates a block diagram of an example circuit breaker 100 with an arc fault detection system for monitoring a high frequency signal(s) on an AC power line 10 (e.g., 50/60 Hz power line) of a protected circuit 20. The circuit breaker 100 includes a controller 110, an analog front end (AFE) 120 to receive signals from a high frequency (HF) sensor 180, a memory 130, a communication interface 140 to communicate with remote or other devices or systems over a communication/transmitting medium, a user interface 150, a power supply 160 to power the components of the circuit breaker 100, and a trip mechanism 170 to interrupt power on the power line 10 upstream of the protected circuit 20. The user interface 150 can include an ON/OFF switch 152 (e.g., a handle), a push-to-test (PTT) button to test the circuit breaker, and one or more LEDs or other indicators for indicating a status of the circuit breaker (e.g., ON, OFF, RESET, TRIPPED, etc.) or other circuit breaker information. The HF sensor 180 can be a high frequency current sensor such as a radio frequency (RF) sensor or receiver, Rogowski coil or other sensor to measure high frequency signals on the power line.

In the circuit breaker 100, the controller 110, the AFE 120 and the memory 130 can operate together to provide an arc fault detection system, which is configured to detect arc fault signals in the high frequency range on the power line 10. The AFE 120 is configured to receive or monitor high frequency signals at desired high frequency region(s) from the HF current sensor 180, and can include bandpass filters and other components for filtering and conditioning signals.

As will be described in further detail herein, the AFE 120 is further configured, among other things, to sample high frequency signals on the power line 10 sequentially at different frequency regions according to a frequency hopping sequence, and to down convert the sampled signals for signal processing for each frequency region in the frequency hopping sequence. The different frequency regions in the frequency hopping sequence can include one or more frequency regions that include a carrier for power line communication on the power line 10 and/or known high frequency noise, and one or more frequency regions that exclude a carrier for power line communication on the power line 10 and/or known high frequency noise. The AFE 120 is configured to implement a frequency hopping sequence of M-frequency regions which is performed N-number of times, where M is the number of frequency regions in the frequency hopping sequence and N is the number of times the frequency hopping sequence is performed within a predefined time period (e.g., a half-cycle of a base frequency, a full-cycle of a base frequency or any greater number of half-cycles).

The controller 110 is configured to process and measure energy on the sampled high frequency signals at the different frequency regions (of the frequency hopping sequence) received from the AFE 120, and to detect for a presence or absence of an arc fault event based on an energy level of each region. For example, the controller 110 is configured to obtain a plurality of energy measurements (e.g., energy envelope or RSSI sample) of the sampled signals for each frequency region in the frequency hopping sequence based on the sampled high frequency signals, and to compute an energy level for each frequency region of the frequency-hopping sequence based on the plurality of energy measurements for each frequency region. The controller 110 is further configured to assign a binary value to each frequency region in the frequency hopping sequence according to the energy level corresponding to the particular frequency region. The binary value represents a presence or absence of signal content in the frequency region. The controller 110 is also configured to determine a presence or absence of an arc fault based on the binary values for the frequency regions of the frequency-hopping sequence and to cause or initiate a trip operation, which interrupts power on the power line 10 via the trip mechanism 170 when an arc fault event or other events are detected.

Furthermore, the controller 110 is also configured to control the operations of the circuit breaker 100 including communication via the communication interface 140 (e.g., to receive or transmit commands, status information/reports, or updates), to perform operations based on actions taken through the user interface 150 by a user, to output a status of the circuit breaker 100 such as via the LED 156, and to perform other operations of the circuit breaker 100 related to arc fault detection and power interruption. Although various signal processing operations for arc detection is described as being performed by the controller 110, one or more of the operations can instead be implemented in a separate processor/processing device in communication with the controller 110, such as in an ASIC or FPGA which can communicate with the AFE 120 or include the components of the AFE 120.

The memory 130 can store computer executable code or programs or software, which when executed by the controller 110, controls the operations of the circuit breaker 100 and its components including the arc fault detection operations and other circuit breaker operations such as circuit interruption. The memory 130 can also store other data used by the circuit breaker 100 or components thereof to perform the operations described herein. The other data can include but is not limited to one or more selectable frequency hopping sequences of frequency regions, one or more selectable predefined time periods, one or more predefined conditions (e.g., energy measurement thresholds for each or all frequency regions, and frequency region/energy level patterns or thresholds for the frequency regions and other predefined conditions to determine an energy level for each frequency region and a presence or absence of an arc fault event), circuit breaker operating parameters, and other circuit breaker data. Some of the data in the memory 130 can also be maintained or stored instead in a memory of the controller 110 or other components of the circuit breaker 100 depending on the system design.

Figure 2:
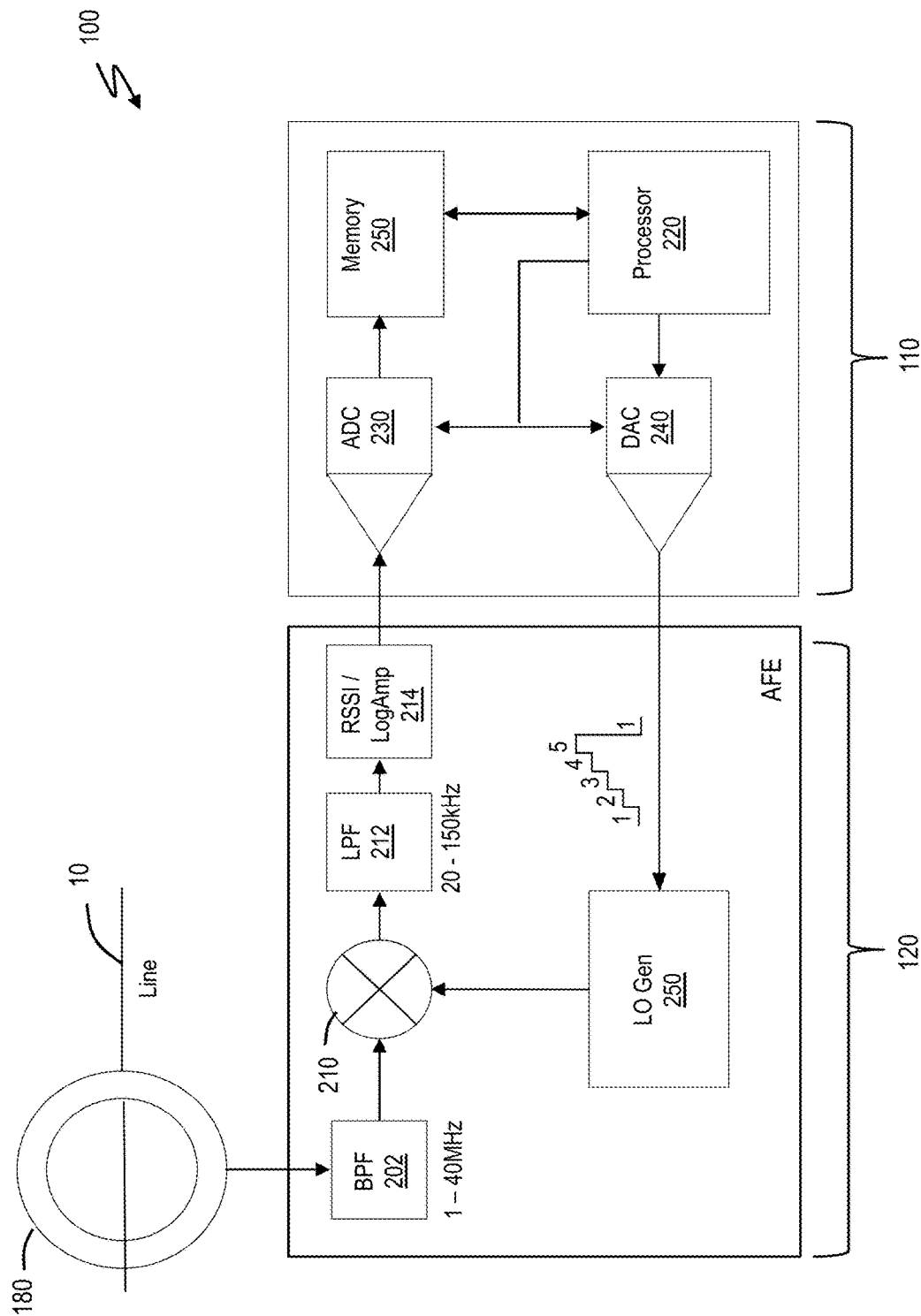
FIG. 2 illustrates a block diagram of components of the arc fault detection system, such as in the circuit breaker of FIG. 1, to sample high frequency signals on the power line using a frequency hopping sequence which sweeps a number of times over a predefined time period through a mixing configuration with a voltage controlled local oscillator in accordance with an example embodiment of the present disclosure.

FIG. 2 illustrates a block diagram of example components of the AFE 120 and the controller 110 of the arc fault detection system, such as in the circuit breaker 100 of FIG. 1, to sample high frequency signals on the power line 10 using a frequency hopping sequence which is performed a number of times over a predefined time period. As shown in FIG. 2, the AFE 120 can include a band pass filter 202, a mixer 210, a low pass filter 212, an RSSI/LogAmp 214 and a local oscillator (LO) generator 250. The controller 110 can include one or more processors 220, an analog-to-digital converter (ADC) 230, a digital-to-analog converter (DAC) 240 and a memory 250 for storing processed data and new data to be processed along with other configuration data (e.g., parameters, thresholds, etc.) used to implement the arc fault detection method described herein.

The band pass filter 202 receives signals, e.g., high frequency signals, which are detected on the power line 10 by the HF sensor 180, and filters the signals to a narrower band. In this example, the band pass filter can allow signals which are between the frequency ranges of about 1 to 40 MHz to pass. The mixer 210 (e.g., a heterodyne device) down-converts high frequency signals (e.g., between 1 MHz and 40 MHz) at a desired frequency region to baseband according to the signals generated by and received from the LO generator 250 (e.g., a voltage controlled oscillator (VCO) generator). The LO (local oscillator) generator 250, which is controlled by the controller 110, is configured to generate LO signals for different frequency regions of a frequency hopping sequence. The LO generator 250 cycles (or sweeps) through the frequency hopping sequence of the different frequency regions of interest (e.g., frequency steps 1, 2, 3, 4 and 5). As the LO generator 250 cycles through each frequency region in the frequency hopping sequence, the mixer 210 sequentially outputs two signals, a down-converted signal to the local oscillator frequency and an up-converted signal a multiple of the local oscillator frequency.

These signals are filtered by the low pass filter 212 to allow only the down-converted signals which represent the baseband signals (e.g., 10 kHz up to 150 kHz) of interest received from the band pass filter 202 at the different frequency regions according to the frequency hopping sequence.

The RSSI or LogAmp 214 can be a logarithmic amplifier or an RF amplifier with fast automatic gain control (AGC) which outputs a representative energy envelope of the signal (e.g., an RF signal) that is received from the low pass filter 212. The energy envelope, which is sometimes referred to as the receiver signal strength indicator (RSSI) or RSSI sample or signal, reflects an energy measurement of the monitored signals on the power line 10 at a particular frequency region of the frequency hopping sequence.

The ADC 230 converts the RSSI sample (e.g., in Volts) to a digital representation (e.g., 16-bits, etc.) for subsequent processing by the processor 220 of the controller 110. The controller 110 can be a microcontroller with built-in successive approximation ADCs having different resolutions (e.g., 6 to 16-bits) and configurable sampling rates (e.g., 10 to 1 M samples per second). The digital output of the ADC 230 is stored in the memory 250, and processed by the processor 220 to detect for a presence or absence of an arc fault according to the arc fault detection methods described herein. The processor 220 controls the sampling of signals from one frequency region to the next frequency region in the frequency hopping sequence, via the DAC 240 and the LO generator 250. The sampling rate can be determined based on the number of frequency steps (e.g., M steps or 5 in this example) and the number of repetitions (e.g., N repetitions of the frequency hopping sequence) within a predefined time period (e.g., a half-cycle period). In this way, the processor 220 can evaluate N energy measurements for each of the M frequency regions in order to detect for a presence or absence of an arc fault event.

Figure 3:
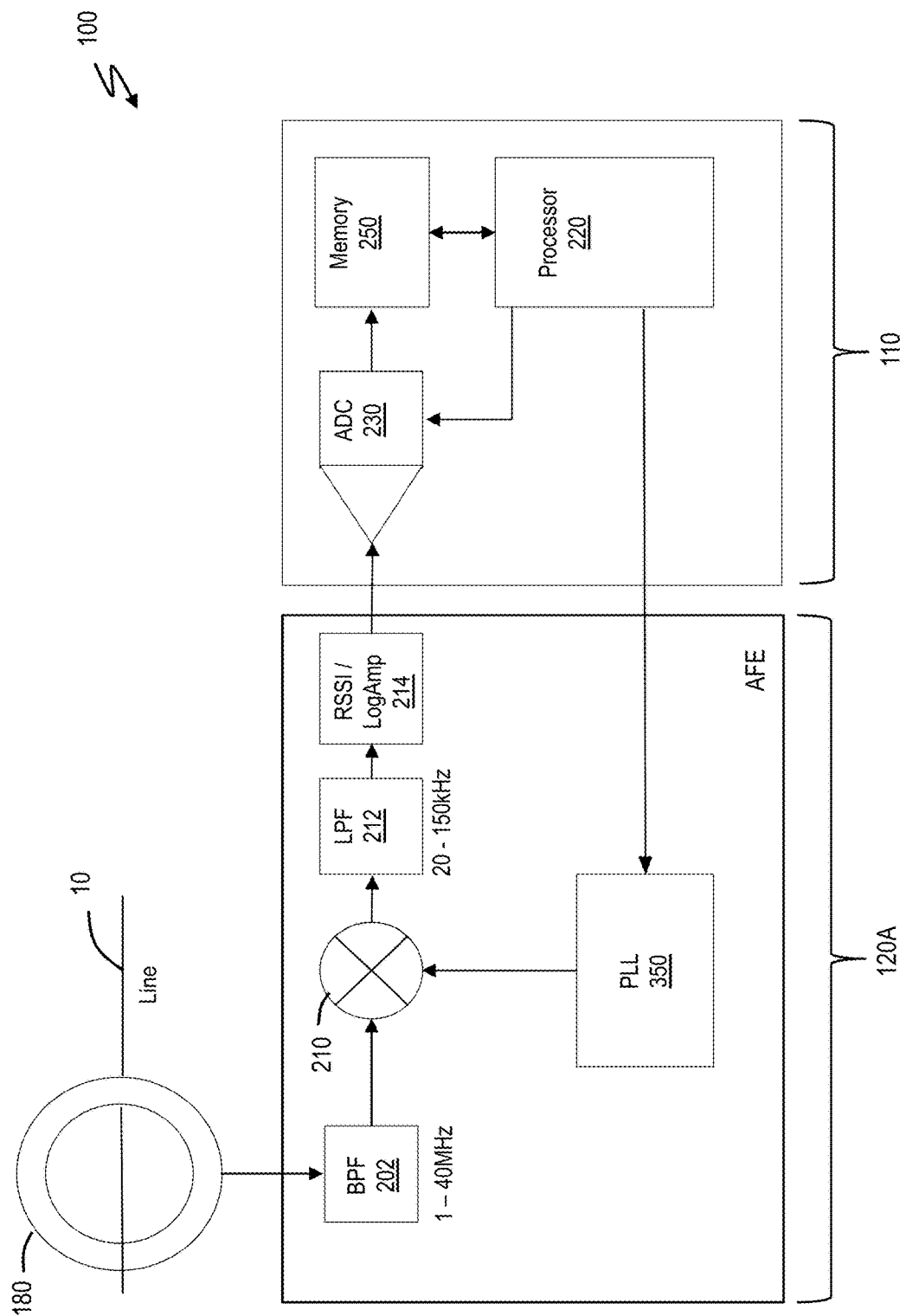
FIG. 3 illustrates a block diagram of components of the arc fault detection system, such as in the circuit breaker of FIG. 1, to sample high frequency signals on the power line using a frequency hopping sequence which sweeps a number of times over a predefined time period through a mixing configuration with a phase locked loop in accordance with an example embodiment of the present disclosure.

FIG. 3 illustrates a block diagram of components of the arc fault detection system, such as in the circuit breaker FIG. 1, to sample signals on the power line using a frequency hopping sequence which is implemented a number of times over a predefined time period in accordance with another example embodiment of the present disclosure. In this alternative example, the arc fault detection system generally includes the same components as that in the example of FIG. 2, except that, in AFE 120A, a phase locked loop (PLL) 350 is used to implement the mixing operations for the different frequency regions according to the frequency hopping sequence.

Figure 4:
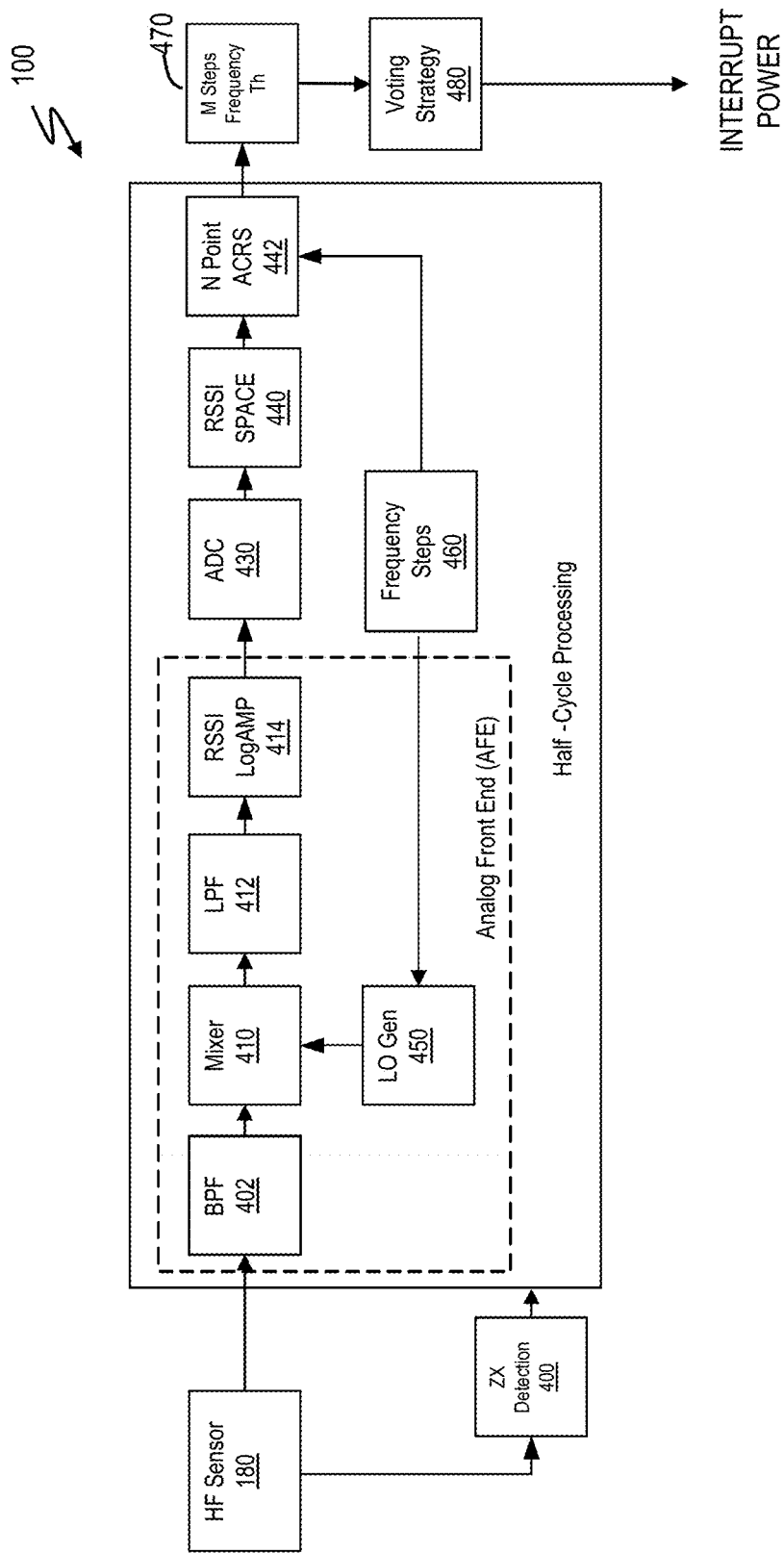
FIG. 4 illustrates a functional block diagram of signal processing operations of the arc fault detection system, such as in the circuit breaker of FIG. 1, to detect an arc fault event, which in turn initiates a power interruption operation in accordance with an example embodiment of the present disclosure.

FIG. 4 illustrates a functional block diagram of signal processing operations performed by the different modules/components of the arc fault detection system, such as in the circuit breaker 100 of FIG. 1, to detect an arc fault event, in accordance with an example embodiment of the present disclosure. In this example, a plurality of energy measurements for each of the frequency regions of the frequency hopping sequence is taken over a predefined period, e.g., a half-cycle period.

At block 400, zero-crossing is detected to begin arc fault detection signal processing operations for a half-cycle period. At block 402, a high frequency signal sensed by the HF sensor 180 (e.g., a HF current sensor) is filtered by a band pass filter to a narrower high frequency band. At block 410, the filtered signal is mixed with an LO signal from a local oscillator generator to down-convert the filtered signals at a particular frequency region (from a plurality of different frequency regions of a frequency hopping sequence) to a baseband. The frequency region of the signal to be demodulated is controlled and changed by the local oscillator generator at block 450 from one frequency region to the next region in a step by step manner over time according to the frequency hopping sequence (at block 460). Alternatively, the frequency hopping sequence of operations can be implemented using a PLL (e.g., FIG. 3).

At block 412, the down-converted and up-converted signals are filtered by a low pass filter to allow a narrow band of the down-converted baseband signal. At block 414, a gain is applied to the filtered signal to produce an energy envelope, which reflects a measurement of the signal strength of the high frequency signal (e.g., RF signal) at the sampled frequency region. A logarithmic amplifier or a RF amplifier with fast automatic gain control (AGC) can be used to produce the energy envelope, e.g., a sample of the RSSI voltage or the like. At block 430, the energy envelope is converted using an ADC from an analog signal to a digital signal, e.g., a digital word (e.g., 6 to 16-bits).

Figure 11:
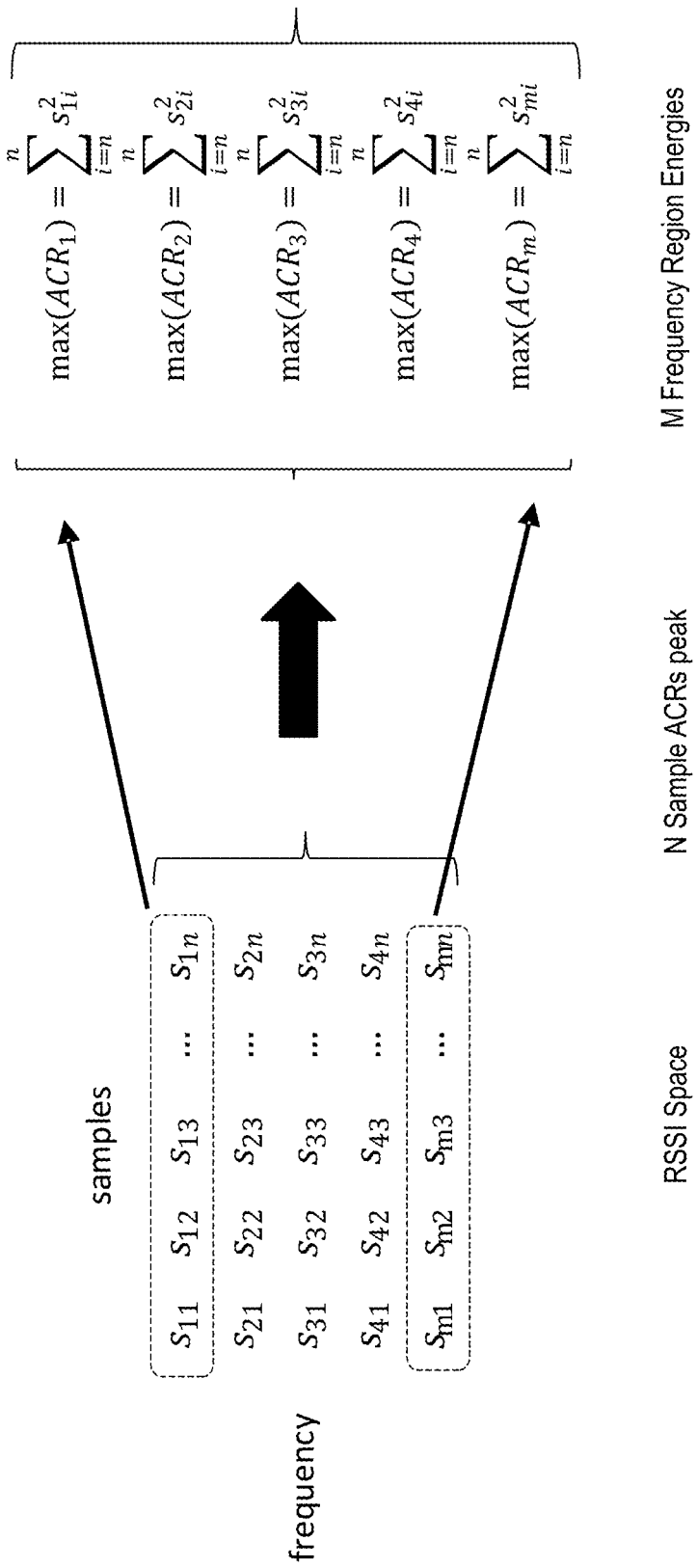
FIG. 11 illustrates an example M×N matrix of the energy measurement samples, such as in FIG. 10, which is generated and used to calculate an energy level of each region in the frequency-hopping sequence over a predefined time period in accordance with another example embodiment of the present disclosure.

At block 440, a matrix of energy measurements is formed from M frequency regions in the frequency hopping sequence, and N sweeps of the sequence of frequency regions within the half-cycle of the base frequency (e.g., power line frequency 50/60 Hz). The matrix can be an M×N matrix of RSSI samples, which form an RSSI space for the half-cycle. For example, a set of M vectors contains all of the N samples of the energy measurements, e.g., RSSI samples, acquired during the predefined period of a half-cycle. An example of a set of vectors for the frequency regions is shown in FIG. 11 (e.g., $S_{11} \ldots S_{1N}, \ldots S_{M1} \ldots S_{MN}$, where M is the number of frequency regions in the frequency hopping sequence, and N is the number of repetitions of the sequence).

At block 442, the energy level of N samples is computed for each frequency region within the half-cycle. This calculation is, for example, computed for each frequency region by performing N summations of squares of each energy measurement sample (e.g., RSSI voltage sample), or computing the peak of auto-correlation of N RSSI samples. The computation is performed on each of the M vectors in the RSSI space for each frequency region in the frequency hopping sequence. An example of the energy level computation for each frequency region is shown in FIG. 11, which is discussed further below.

At block 460, the sampling of signals, which are monitored on a power line, is controlled on a sequential step-by-step basis from one frequency region to the next frequency region of the frequency hopping sequence over time, via the LO signal generated by generated by the local oscillator generator (at block 450). The sequence of frequency regions are repeated N times, for example, within the predefined period of a half-cycle. Accordingly, over the half-cycle, for each frequency region, the ADC operation at block 430 samples the RSSI, e.g., an RSSI voltage sample, at the output of the RSSI log amplifier (at block 414) and stores the digital sample S in memory (e.g., $S_{M \times N}$) for further processing at blocks 440 and 442 as previously discussed above. The module implementing (Frequency Steps) block 460 can provide for the synchronization of the operations of the local oscillator generator (at block 450) in implementing and repeating the frequency hopping sequence, and of the energy calculations from the sample vectors (at block 442).

At block 470, an energy threshold is applied to the computed energy level for each M frequency region, which is then converted to a binary value reflecting a presence or absence of high frequency content in the frequency region based on the comparison. For example, each of the M frequency regions (in the frequency hopping sequence) is assigned a binary value, e.g., 0 or 1, based on whether enough RSSI energy was present in the frequency region during the predefined period of a half-cycle. Because all of the energy samples for each frequency region are time dependent, the accumulative energy for each frequency region is compared against an energy threshold which can for example be determined empirically by experimentation in a laboratory environment. In operation, a frequency region can for example be assigned a value of 1 if the threshold condition is satisfied, and a value of 0 if the threshold condition is not satisfied (or vice-a-versa). Because arcing generates wide band RF signals and lasts for the most part of the half-cycle, the overall energy can be measured in such a manner for each frequency region.

At block 480, the energy levels for all of the frequency regions are evaluated based on a predefined condition(s) (e.g., a voting strategy, predefined thresholds, frequency region/energy level patterns, etc.). The predefined conditions can be defined by the number and nature of the frequency regions having and/or not having high frequency content within the predefined time period. In another example, an arc fault event is detected if a total number of frequency regions identified as having high frequency content satisfies a number threshold, or a combination/pattern of certain regions with and/or without noise carriers are found to have high frequency content. As previously discussed, the frequency regions can have one or more regions that include a carrier of power line communication or other known noise, and one or more regions that exclude a carrier of power line communication or other known noise. A further example of a predefined condition is provided in the voting strategy example of FIG. 12, which is discussed further below.

In the event that the predefined condition is satisfied, an arc fault event is detected on the power line, and accordingly, power can be interrupted on the power line via a trip mechanism to provide for circuit protection.

Figure 5:
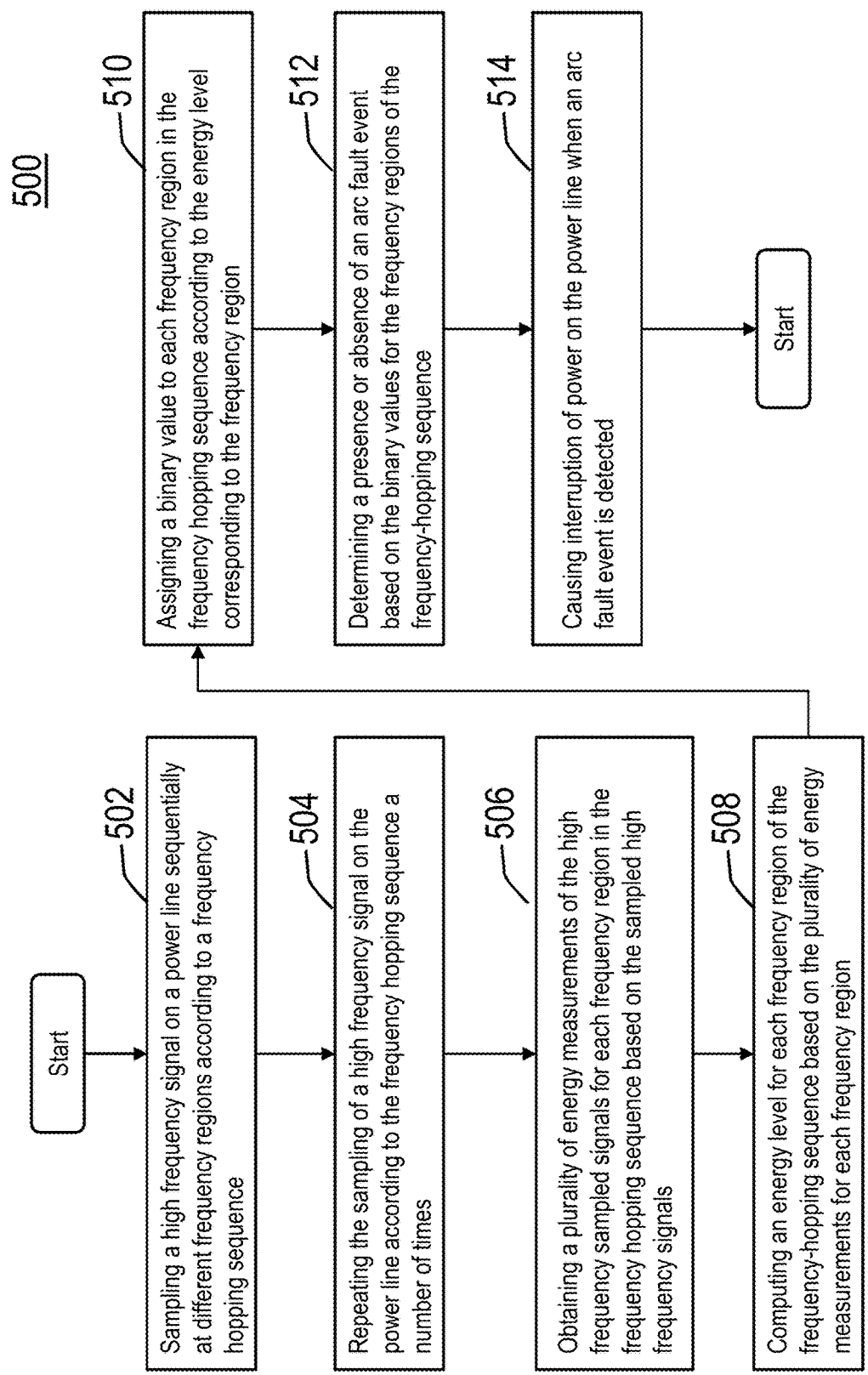
FIG. 5 illustrates a flow diagram of an example process implemented by the arc fault detection system, such as in the circuit breaker of FIG. 1, by which an arc fault signal is detected from high frequency signals monitored on a power line in accordance with an example embodiment of the present disclosure.

FIG. 5 illustrates a flow diagram of an example process 500 implemented by the arc fault detection system, such as in the circuit breaker 100 of FIG. 1, by which an arc fault signal is detected from signals monitored on a power line in accordance with an example embodiment of the present disclosure. For the purpose of explanation, the process 500 will be described with reference to the components of the circuit breaker 100 of FIG. 1, such as the controller 110 and AFE 120.

At step 502, the AFE 120 samples a high frequency signal on a power line sequentially at different frequency regions according to a frequency hopping sequence. The different frequency regions include at least one frequency region that includes a carrier for power line communication (or other known noise) on the power line and at least one frequency region that excludes a carrier for power line communication (or other known noise) on the power line. The AFE 120 can also perform filtering and conditioning on the sampled signals. At step 504, the AFE 120 repeats the sampling of high frequency signals on the power line according to the frequency hopping sequence a number of times. For example, the sequence is repeated in total N times to generate N signal samples for each of the M frequency regions in the sequence over a predefined time period. As previously discussed, the controller 110 can control signal sampling according to the frequency hopping sequence over time via an LO generator or PLL.

At step 506, the AFE 120 obtains a plurality of energy measurements (e.g., RSSI voltage samples) of the sampled high frequency signals for each frequency region in the frequency hopping sequence based on the sampled high frequency signals. The energy measurements can be converted to a digital form for processing by the controller 110. At step 508, the controller 110 computes an energy level for each frequency region of the frequency-hopping sequence based on the plurality of energy measurements for each frequency region. For example, the energy level for each frequency region can be determined by performing N summations of squares of the RSSI samples (e.g., RSSI voltage samples) for the frequency region, or by computing the peak of auto-correlation of N RSSI samples.

At step 510, the controller 110 assigns a binary value to each frequency region in the frequency hopping sequence according to the energy level corresponding to each frequency region. The binary value represents a presence or absence of signal content in the frequency region over the predefined period of time.

At step 512, the controller 110 determines a presence or absence of an arc fault event based on the binary values for the frequency regions of the frequency-hopping sequence. For example, the energy levels are evaluated in relations to predefined conditions (e.g., predefined thresholds, frequency region/energy level patterns, etc.). An arc fault event is detected when the energy levels for the frequency regions of the frequency hopping sequence satisfy the predefined condition.

At step 514, when an arc fault event is detected, the controller 110 causes the interruption of power on the power line, e.g., by tripping a trip mechanism or other power interruption device.

Figure 6:
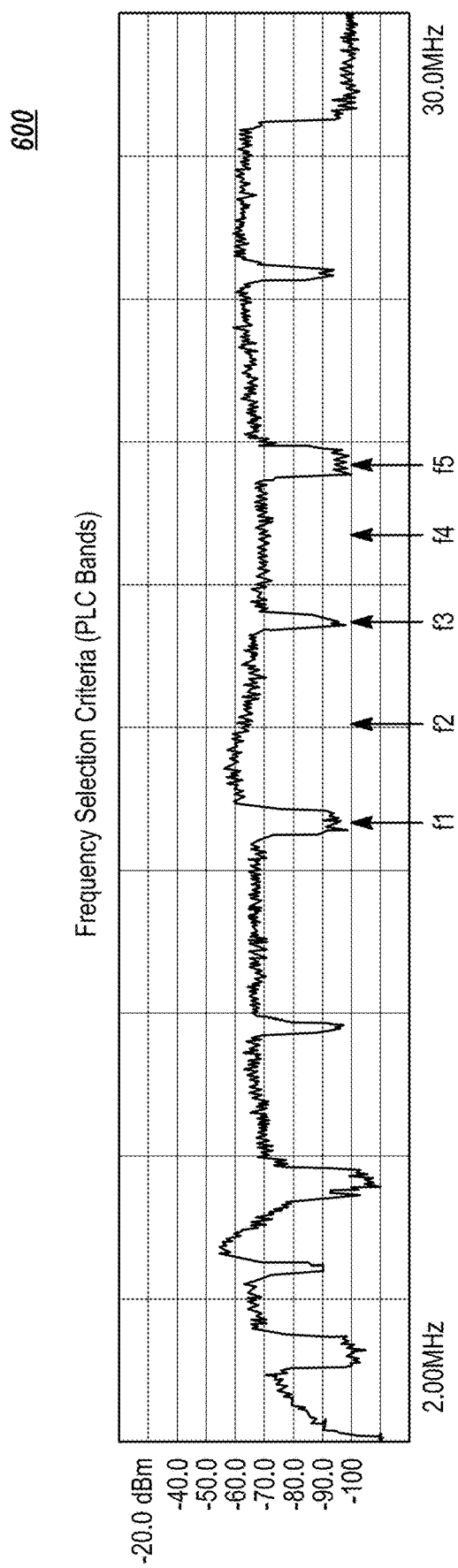
FIG. 6 illustrates a graph of magnitude versus frequency of an example power line communication (PLC) signal showing frequency regions which include and exclude PLC carrier regions.

FIG. 6 illustrates a graph 600 of magnitude versus frequency of example power line communication (PLC) signals showing frequency regions which include and exclude PLC carrier regions. As shown in FIG. 6, the peaks reflect PLC carrier regions and the notches reflect non-PLC carrier regions. Based on known or empirical data on PLC carrier regions and non-PLC carrier regions, a plurality of frequency regions can be selected for use in monitoring signals on the power line. In this example, the frequency hopping sequence can include five selected frequency regions f1, f2, f3, f4 and f5 to be monitored on the power line. The frequency regions f1, f3 and f5 (e.g., notches) exclude noise such as PLC carriers. The frequency regions f2 and f4 (e.g., carrier regions) include noise such as PLC carriers.

Figure 7:
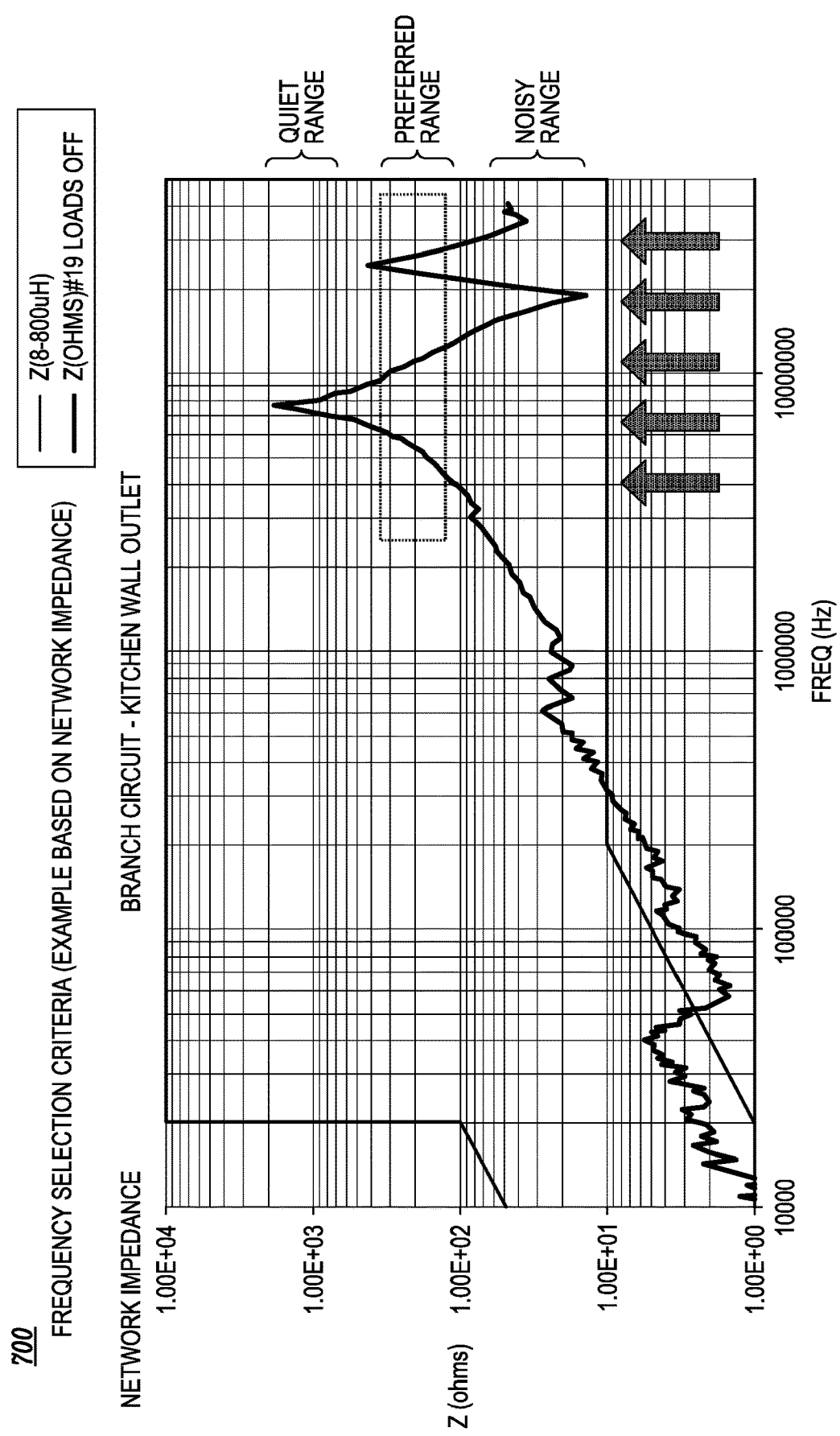
FIG. 7 illustrates a graph of impedance versus frequency of a power line, showing frequency selection criteria based on the network impedance in accordance with an example embodiment of the present disclosure.

FIG. 7 illustrates a graph 700 of impedance versus frequency of a power line communication network, showing frequency selection criteria based on the network impedance in accordance with an example embodiment of the present disclosure. In this example, the graph 700 can reflect the network impedance in a branch circuit, e.g., a kitchen wall outlet. As shown in the graph 700, there are noisy ranges and quiet ranges that correspond to certain aspects of the power line network. Frequency regions can be selected from a preferred range to include a combination of noisy regions and quiet regions in order to obtain a fuller picture of signal events occurring on the power line given the wideband nature of signals produced by an arcing. It is expected that arcing can more readily be seen on the quiet regions due to its wide band nature.

Figure 8:
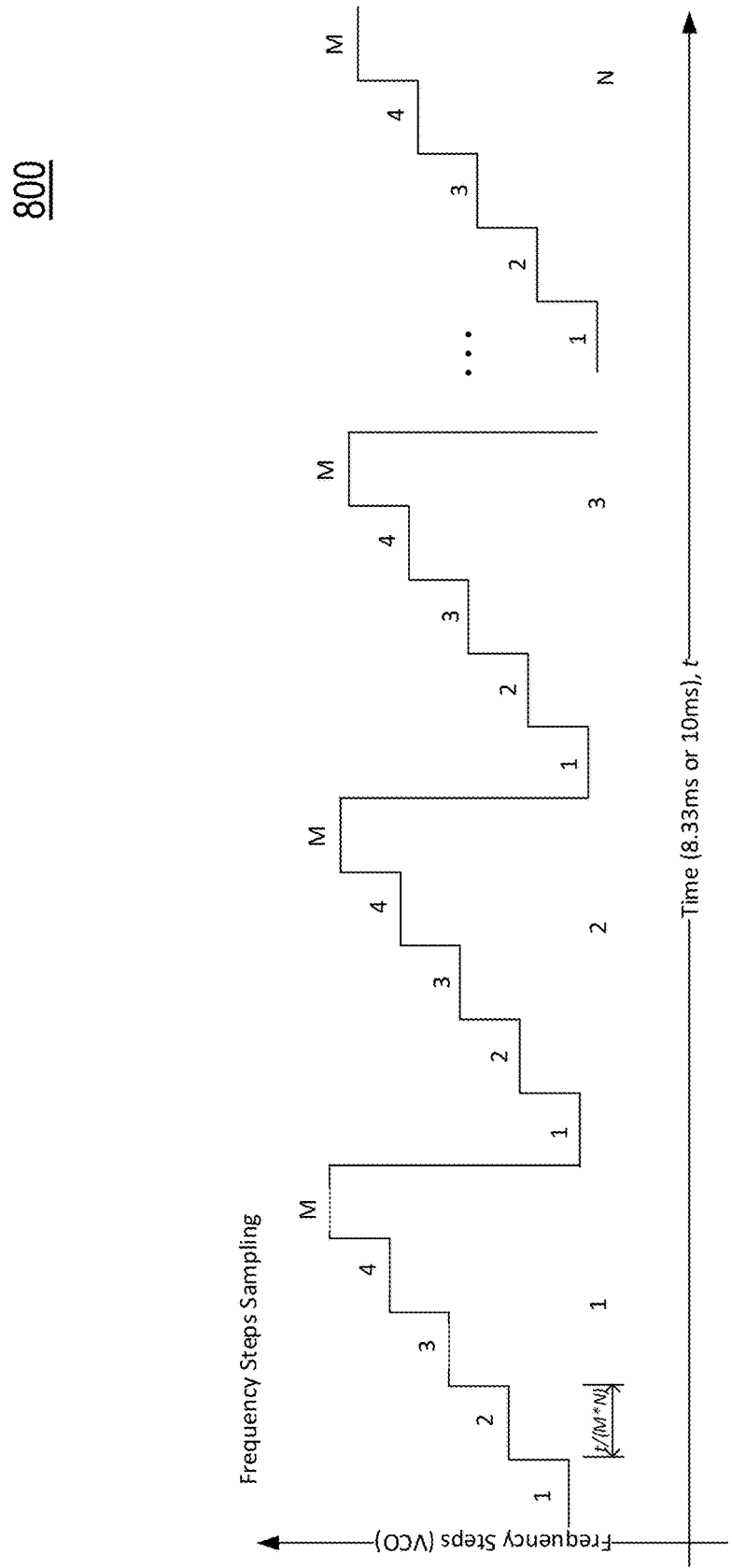
FIG. 8 illustrates a graph of frequency versus time of an example frequency hopping sequence of frequency regions for sampling high frequency signals on a power line in accordance with an example embodiment of the present disclosure.
Figure 9:
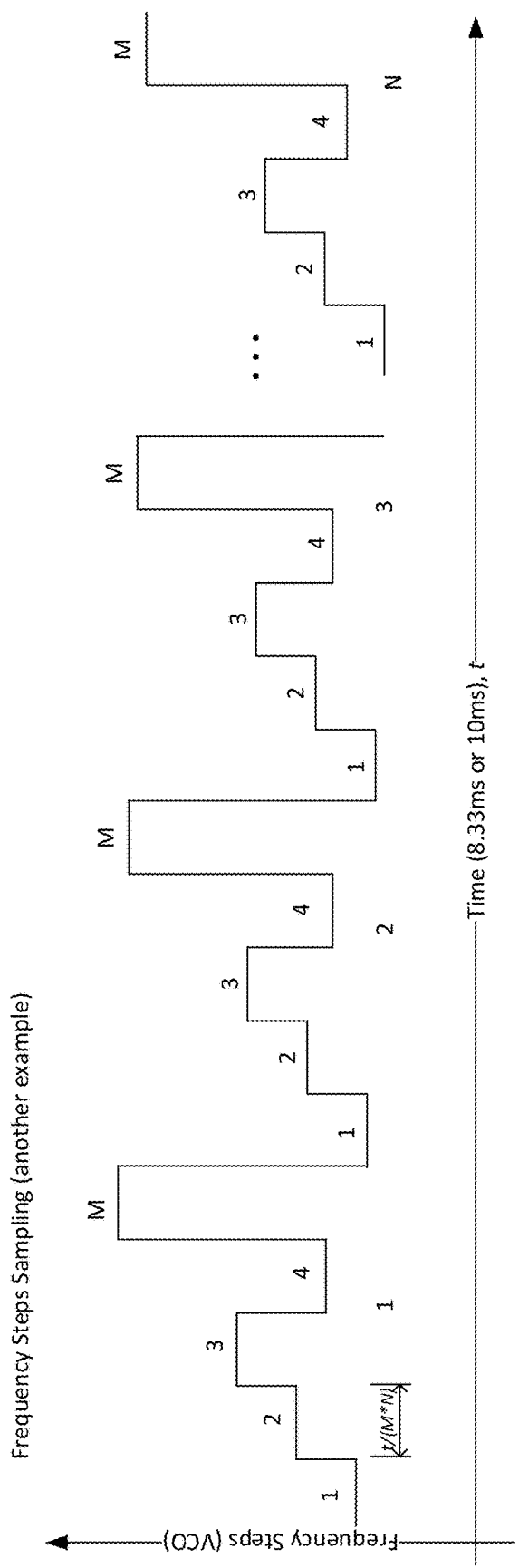
FIG. 9 illustrates a graph of frequency versus time of an example frequency hopping sequence of frequency regions for sampling high frequency signals on a power line in accordance with another example embodiment of the present disclosure.

FIG. 8 illustrates a graph 800 of frequency versus time of an example frequency-hopping sequence of frequency regions for sampling signals on a power line in accordance with an example embodiment of the present disclosure. In this example, the frequency hopping sequence includes M different frequency regions (e.g., frequency steps 1, 2, . . . M), which have sequentially increasing frequencies. The frequency hopping sequence is repeated N times over a predefined time period. However, it should be understood that the frequency hopping sequence can have a sequence of frequency regions that do not sequentially increase or decrease in frequency, such as shown in the graph 900 in the example of FIG. 9.

Figure 10:
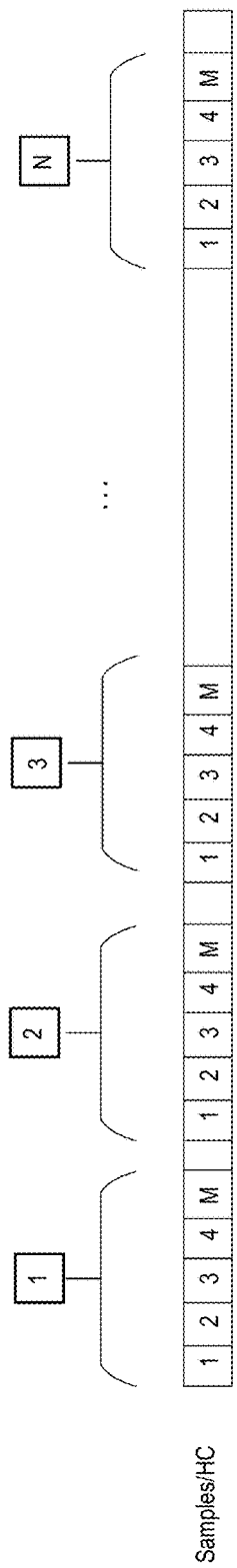
FIG. 10 illustrates energy measurement samples, such as for example RSSI samples, for a M-region frequency-hopping sequence, which is implemented N-times over a predefined time period, such as a half-cycle of a base frequency, in accordance with another example embodiment of the present disclosure.

FIG. 10 illustrates a data stream 1000 of energy measurement samples, such as for example RSSI voltage samples, for a M-region frequency-hopping sequence. The sequence can be implemented N-times over a predefined time period, such as a half-cycle, to produce M×N energy measurements. The energy measurement samples can be output from the ADC 230 of FIGS. 2 and 3.

FIG. 11 illustrates an example M×N matrix of energy measurement samples, such as in FIG. 10, which is used to calculate an energy level for each frequency region in the frequency-hopping sequence in accordance with an example embodiment of the present disclosure. As shown in FIG. 11, the M×N matrix includes samples of energy measurements for each of the M frequency regions (e.g., $S_{11}$ . . . $S_{1N}$, . . . $S_{M1}$ . . . $S_{MN}$). In this example, the energy measurement samples are RSSI samples that form the matrix (e.g., RSSI space). The matrix can be used to compute the auto-correlating peak energy level, e.g., $E_m = \max(ACR_m) = \Sigma_{i=1}^{N}(s_{mi})$, for each of the M frequency regions, where m is the order of the frequency region between 1 to a maximum M in a frequency hopping sequence, n is a number from 1 to a maximum N that the frequency hopping sequence is performed, M is the number of frequency steps, N is the number of sweeps within a half-cycle, and S is an energy measurement sample at a frequency step of a frequency hopping sequence.

As previously discussed, binary classification can then be performed for each frequency region by comparing the energy level of the region to an energy threshold. The threshold can be determined based on some statistical analysis of different measurements performed in a controlled laboratory environment.

Figure 12:
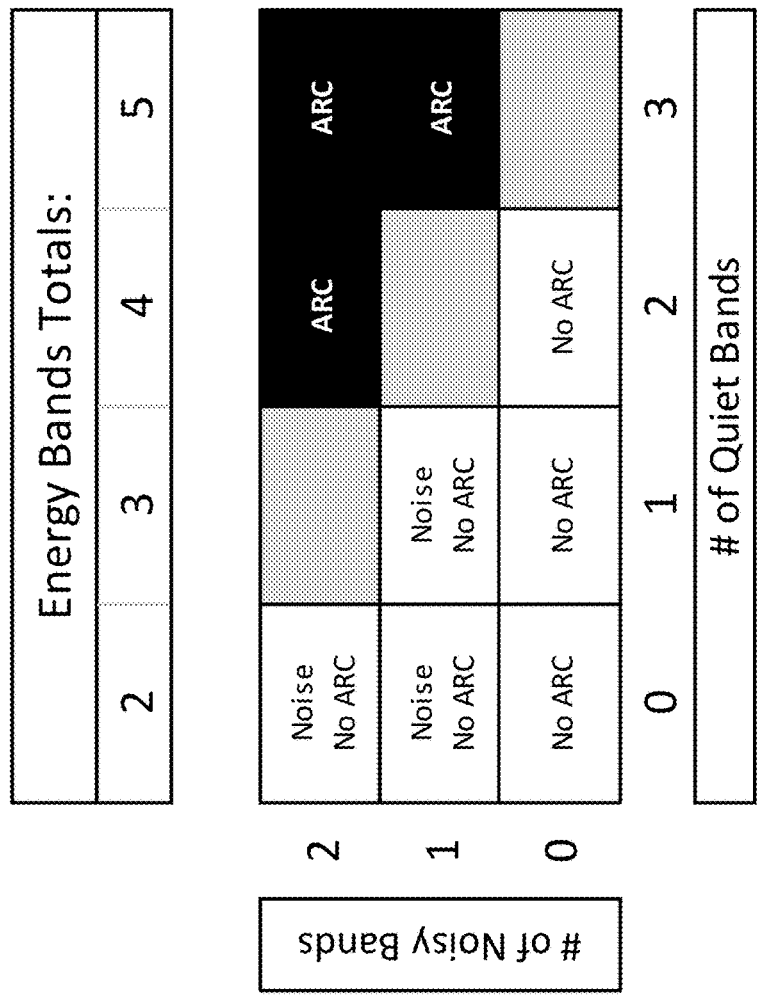
FIG. 12 illustrates a voting strategy for determining a presence or absence of an arc fault event according to the calculated energy levels for each region of the frequency hopping sequence in accordance with another example embodiment of the present disclosure.

FIG. 12 illustrates a voting strategy 1200, which is shown in a table format, for determining a presence or absence of an arc fault event according to the calculated energy levels for each region of the frequency-hopping sequence in accordance with an example embodiment of the present disclosure. In this example, there are five frequency regions (e.g., M=5) that are monitored using the frequency hopping sequence. The five frequency regions include 2 noisy bands (e.g., with noise such as PLC carrier bands) and 3 quiet bands (e.g., without noise such as PLC carrier bands). An arc fault event (ARC) is detected when a predefined condition is satisfied, e.g., four or more frequency regions (or a combination of specific regions) have energy levels reflecting a presence of signal content, as shown in the table. The voting strategy table is provided as one example of a predefined condition. Other combinations of the frequency region/energy level, such as for example those combinations of noisy and quiet bands on the table which are neither identified as ARC or No ARC, can also reflect an arcing signature, and thus, an arc fault event.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, thresholds, masks and other elements used herein are provided as examples, and can be given a different name or label.

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

A processor(s) or controller(s) as described herein can be a processing system, which can include one or more processors, such as CPU, GPU, controller, FPGA (Field Programmable Gate Array), ASIC (Application-Specific Integrated Circuit) or other dedicated circuitry or other processing unit, which controls the operations of the devices or systems, described herein. Memory/storage devices can include, but are not limited to, disks, solid state drives, optical disks, removable memory devices such as smart cards, SIMs, WIMs, semiconductor memories such as RAM, ROM, PROMS, etc. Transmitting mediums or communication mediums or networks include, but are not limited to, transmission via wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

Furthermore, the arc fault detection features and functions, described herein, can be implemented in a circuit breaker, or across separate component(s) or module(s), which can communicate and interact with a circuit breaker or other power interruption device to facilitate interruption of power (e.g., current or voltage) on a power line of a circuit when an arc fault event is detected. For example, the signal sample processing performed over a predefined period (e.g., a half-cycle), as described herein, can be implemented in the same processor or controller, or a separate processor (e.g., a separate ASIC or FPGA which can also include the components of the analog front end).

In addition, the predefined time period can be a half-cycle of a base frequency, a full-cycle of a base frequency or any number of half-cycles. The number M of frequency regions in the frequency hopping sequence, and N repetitions of the sequence can be selected to obtain a suitable amount of energy measurement samples within a selected predefined time period, or vice-a-versa.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A method of detecting an arc fault on a power line, comprising:
   repeatedly sampling a high frequency signal on a power line sequentially at different frequency regions according to a frequency hopping sequence over a predefined time period, the different frequency regions including at least one frequency region that includes a carrier for power line communication on the power line and at least one frequency region that excludes a carrier for power line communication on the power line;
   computing a plurality of energy levels for the frequency regions of the frequency-hopping sequence, based on a plurality of energy measurements of the sampled high frequency signals;
   classifying the frequency regions in the frequency hopping sequence as having a presence or an absence of signal content in the respective frequency region, according to the computed energy level corresponding to the respective frequency region; and
   determining a presence or absence of an arc fault event based on the classifications of the frequency regions.

2. The method of claim 1, wherein a frequency of each frequency region sequentially increases or decreases in the frequency hopping sequence.

3. The method of claim 1, wherein the obtaining an energy measurement comprises:
   for each iteration of the frequency hopping sequence, generating an energy envelope or received signal strength indicator (RSSI) voltage sample for each frequency region in the frequency hopping sequence based on the sampled high frequency signal.

4. The method of claim 3, wherein the computing an energy level comprises:
   for each frequency region, auto-correlating the plurality of energy envelopes or RSSI voltage samples of the frequency region to obtain a peak energy value as the energy level, or summing squared RSSI voltage samples of the frequency region to obtain a summed energy value as the energy level.

5. The method of claim 1, wherein the frequency hopping sequence includes a sequence of M frequency regions, and the frequency hopping sequence is performed N times, the computing computes the energy level for each of the M frequency regions using the following equation:

$$E_m = \max(ACR_m) = \Sigma_{n=1}^{N}(s_{mn}),$$

where:
   m is the order frequency region between 1 to a maximum M in the frequency hopping sequence,
   n is a number from 1 to a maximum N that the frequency hopping sequence is performed,
   S is an energy measurement sample at a frequency step of a frequency hopping sequence,
   $E_m$ is an energy level for a frequency hopping sequence m, and
   $\max(ACR_m)$ is a peak autocorrelation of N-energy measurement samples for a frequency hopping sequence m.

6. The method of claim 1, wherein the sampling a high frequency signal comprises:
   for each frequency region in the frequency-hopping sequence, down converting the high frequency signal associated with the frequency region, applying a low pass filter to the down converted signal, and generating an energy envelope or RSSI sample for the filtered signal.

7. The method of claim 1, wherein the determining a presence or absence of an arc fault event further comprises determining whether the classifications of the frequency regions in the frequency hopping sequence satisfy a predefined condition.

8. The method of claim 1, wherein the predefined time period is a half-cycle of a base frequency.

9. The method of claim 1, further comprising:
   causing interruption of power on the power line when an arc fault event is detected.

10. An arc fault detection device for detecting an arc fault on a power line, comprising:
    an analog front end configured to:
       repeatedly sampling a high frequency signal on the power line sequentially at different frequency regions according to a frequency hopping sequence over a predefined time period, the different frequency regions including at least one frequency region that includes a carrier for power line communication on the power line and at least one frequency region that excludes a carrier for power line communication on the power line;
    a memory; and
    one or more processors, in communication with the memory, configured to:
       compute a plurality of energy levels for the frequency regions of the frequency-hopping sequence, based on a plurality of energy measurements of the sampled high frequency signals;
       classify the frequency regions in the frequency hopping sequence as having a presence or an absence of signal content in the respective frequency region, according to the computed energy level corresponding to the respective frequency region; and
       determine a presence or absence of an arc fault event based on the classifications of the frequency regions.

11. The device of claim 10, wherein a frequency of each frequency region sequentially increases or decreases in the frequency hopping sequence.

12. The device of claim 10, wherein, to obtain an energy measurement, the analog front end is configured to:
    for each iteration of the frequency hopping sequence, generate an energy envelope or received signal strength indicator (RSSI) voltage sample for each frequency region in the frequency hopping sequence based on the sampled high frequency signal.

13. The device of claim 12, wherein, to compute an energy level, the processor is configured to:
    for each frequency region, auto-correlate the plurality of energy envelopes or RSSI voltage samples of the frequency region to obtain a peak energy value as the energy level, or sum squared RSSI voltage samples of the frequency region to obtain a summed energy value as the energy level.

14. The device of claim 10, wherein the frequency hopping sequence includes a sequence of M frequency regions, and the frequency hopping sequence is performed N times, the processor being configured to compute the energy level for each of the M frequency regions using the following equation:

$$E_m = \max(ACR_m) = E_{n=1}^{N}(s_{mn}),$$

where:
- m is the order frequency region between 1 to a maximum M in the frequency hopping sequence,
- n is a number from 1 to a maximum N that the frequency hopping sequence is performed,
- S is an energy measurement sample at a frequency step of a frequency hopping sequence,
- $E_m$ is an energy level for a frequency hopping sequence m, and
- $\max(ACR_m)$ is a peak autocorrelation of N-energy measurement samples for a frequency hopping sequence m.

15. The device of claim 10, wherein to sample the high frequency signal, the analog front end is configured to:
for each frequency region in the frequency-hopping sequence, down convert the high frequency signal associated with the frequency region, apply a low pass filter to the down converted signal, and generate an energy envelope or RSSI sample for the filtered signal.

16. The device of claim 10, wherein the processor is configured to determine a presence or absence of an arc fault event when the binary values satisfy a predefined condition.

17. The device of claim 10, wherein the predefined time period is a half-cycle of a base frequency.

18. The device of claim 10, wherein the analog front end comprises:

a mixer configured to sequentially demodulate the high frequency signal at different frequency regions according to the frequency hopping sequence using a local oscillator or phase locked loop, the high frequency signal being demodulated by the mixer to a baseband signal; and one or more band pass filters to filter the high frequency signal or the demodulated baseband signal.

19. The device of claim 10, wherein the processor is further configured to cause interruption of power on the power line when an arc fault event is detected.

20. A non-transitory tangible computer medium storing computer executable code, which when executed, is configured to implement a method of detecting an arc fault on a power line, the method comprising:

repeatedly sampling a high frequency signal on a power line sequentially at different frequency regions according to a frequency hopping sequence over a predefined time period, the different frequency regions including at least one frequency region that includes a carrier for power line communication on the power line and at least one frequency region that excludes a carrier for power line communication on the power line;

computing a plurality of energy levels for the frequency regions of the frequency-hopping sequence, based on a plurality of energy measurements of the sampled high frequency signals;

classifying the frequency regions in the frequency hopping sequence as having a presence or an absence of signal content in the respective frequency region, according to the computed energy level corresponding to the respective frequency region; and determining a presence or absence of an arc fault event based on the classifications of the frequency regions.

* * * * *